July 26, 1949.    D. M. COMB    2,477,511
LIQUID LEVEL CONTROL
Filed June 4, 1948

INVENTOR.
David M. Comb
BY Donald K. Lippincott
ATTORNEY

Patented July 26, 1949

2,477,511

UNITED STATES PATENT OFFICE 2,477,511

LIQUID LEVEL CONTROL

David M. Comb, Belmont, Calif.

Application June 4, 1948, Serial No. 31,019

7 Claims. (Cl. 315—194)

This invention relates to apparatus for the control and indication of liquid levels through the operation of valves or pumps by means of which such levels are maintained.

Among the objects of the invention are:

To provide a control wherein no moving parts are exposed to the liquid;

To provide a control wherein all of the parts which are exposed to the liquid may be completely covered with materials which are resistive to the action of the liquid, so that corrosive materials can be controlled with equal facility as noncorrosive materials;

To provide a control which is equally applicable to electrolytic and nonelectrolytic liquids;

To provide a control in which extremely accurate settings of the points of operation or "critical points" is possible;

To provide a control wherein the latitude or "spread" between the "on" and "off" points can be readily and accurately adjusted to meet the desired conditions of operation, so that it is possible to avoid both too wide a fluctuation in liquid level and too frequent switching of the mechanism between the on and off positions; and To provide a control of maximum reliability, accuracy, and simplicity, which has, at the same time, its range of sensitivity completely under the command of the operator.

Other objects and advantages of this invention will be referred to or will become apparent in the ensuing description of the preferred form of my apparatus, taken in connection with the accompanying drawings, wherein:

Fig. 4 is a circuit diagram of a modification of the circuit shown in Fig. 1, adapted for operation on smaller changes of capacity, and also adapted to reverse the operation of the device.

Liquid control devices are utilized in many industrial processes, in many ways, and subject to many different requirements such as resistance to corrosion, sanitation, cycle of operation, and tolerance as to liquid level. One very severe type of duty is in refrigeration equipment, where the liquid to be controlled may be sulphur dioxide or liquid ammonia, both of which are highly corrosive and are handled under high pressure, so that there is danger of leakage or explosion. An entirely different type of duty is in handling food stuffs such as milk, cream, or syrups, where one of the primary requirements is that the elements which are exposed to the liquids to be controlled must be kept bacteriologically sterile. Still another type of duty is imposed upon controls for the level of inflammable liquids such as gasoline, where the hazard most seriously to be avoided is that of an electric spark which may precipitate an explosion of an entirely different type. In all of these applications it is essential that, should any failure occur in the equipment, it should "fail safe." Furthermore, some of the liquids mentioned are electrolytes, while others are dielectrics. One of the principal advantages of the equipment of my invention is that it will meet the requirements of all of these various services without major adjustment, and with only such minor modification as can readily be made by an installer with his ordinary tools.

Figure 1:
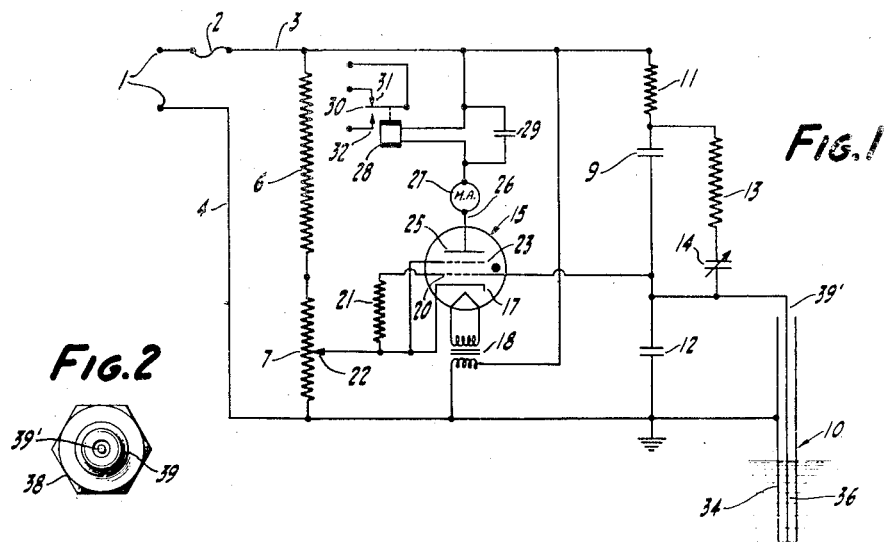
Fig. 1 is a circuit diagram of a preferred embodiment of my invention.
Figure 2:
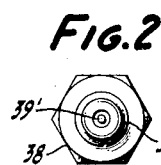
Fig. 2 and Fig. 3 are, respectively, a plan and a view partly in elevation and partly in section of a capacity element for use as the sensitive member for determining the liquid level.
Figure 3:
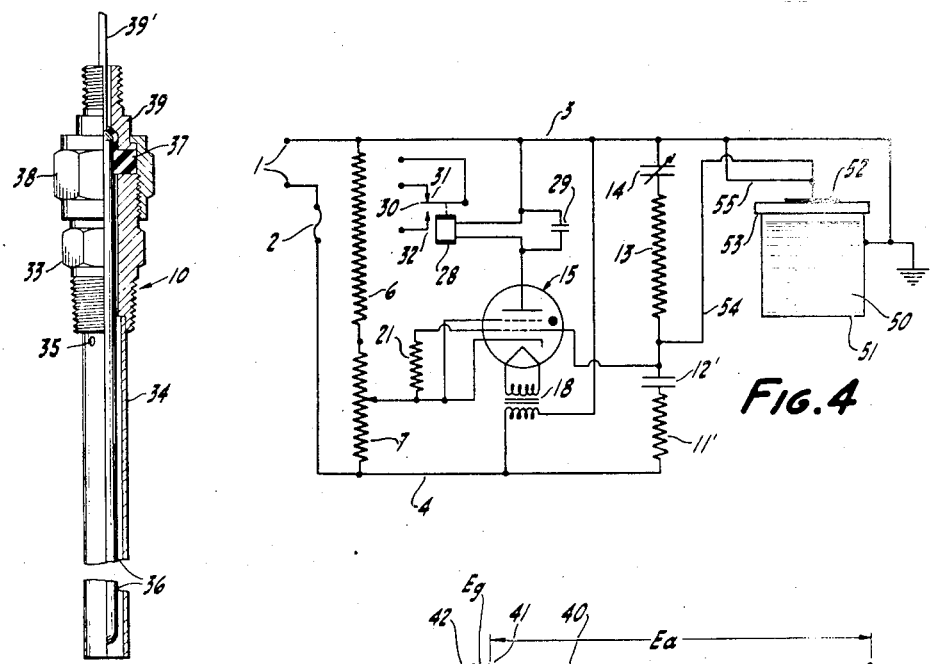

Fig. 1 shows the circuit of my invention connected for an application requiring moderate sensitivity, as, for example, in the case of a control of liquid ammonia in a refrigerating system. The device is provided with a pair of terminals 1 for connection to the ordinary alternating current supply and mains, and is protected by fuse 2. Connected with the terminals 1 are lines 3 and 4, constituting the general supply of circuit across which the various other circuits constituting the equipment are bridged.

The first of these bridging circuits is a voltage divider of sufficient impedance and carrying capacity to withstand being permanently connected across the supply voltage, say 120 volts. This can be a simple potentiometer, or a variable inductor such as the "Variac." However, I find it economical and convenient to form the voltage divider out of two resistors, and in a standard form of the device designed for general purpose use I employ a fixed resistor 6 of 10,000 ohms in series with a potentiometer 7 of 2,000 ohms resistance.

Connected in parallel with the voltage divider is a capacitive network. This comprises essentially a condenser 9 connected in series with the sensitive element 10. It is desirable, however, to provide additional elements in this network. One of these is a resistor 11, of about 40,000 ohms resistance, which functions purely as a safety device to prevent any serious shock to anyone coming in contact with the live portion of the circuit. As the impedance in series with this resistance is of the order of 10 megohms the resistor 11 has a negligible effect upon the phasing of the currents and voltages through the circuit.

A second condenser 12, connected in parallel with the sensitive element 10, is optional; in some instances it is desirable to have the sensitive element located at a considerable distance from the control apparatus proper, and in such cases I connect the two through a coaxial cable. Such a cable has a material capacity, and in order to standardize manufacture I proportion the circuits normally for the longest cable which will ordinarily be used, and where a short cable is employed instead a condenser 12 maintains the operating points of the equipment at the same position by supplying an additional capacity equivalent to that of the cable.

Of much greater importance, however, and, in fact, one of the features which contributes most greatly to the usefulness of the device, is a circuit comprising a high resistance 13 in series with a small variable condenser 14. In the general purpose equipment mentioned the condenser 9 is normally supplied with a capacitance of 250 micro-microfarads. The element 10 and the condenser 12, in parallel, may have a capacitance of the order of 5,000 micro-microfarads; the condenser 14 the capacitance of 140 micro-microfarads and the resistor 13 a resistance of 10 megohms. It is to be understood that these values are given for illustrative purposes only, and that they can be departed from very widely to meet varying conditions in practice.

The active control element of the device is a tube of the grid-controlled gaseous-discharge type or "grid glow" tube. For best results I employ a tube 15 having a heated cathode 17, the heater being excited by a transformer 18 bridged across the lines 3 and 4. Suitable for the purpose are tubes marketed under the designations of GL-502-A, or GL-2050. Both of these are doubled grid inert gas-filled tubes, which can be operated with a shield grid connected to the cathode at the voltages here contemplated, and which normally operate with their control grids negative by the amount of a volt or two during the half of the cycle during which discharge takes place; i. e., operating with a supply voltage of 120 R. M. S., 170 peak, discharge will occur at the peak if the grid is less than one and one-half volts negative at that instant. This is the average case, as there is a considerable variation between individual tubes.

The control grid 20 of the tube is connected to the junction of the element 10 and the condenser 9. It is provided with a high resistance (up to ten megohms) grid leak 21, connected to the variable contact 22 on the voltage divider. The screen grid 23 of the tube is connected to the cathode.

The work circuit comprises the anode 25 of the tube 15 which connects through a lead 26 (and optionally, through a milliammeter 27) and the coil 28 of a relay to the lead 3. A condenser 29 is preferably bridged across the relay to prevent chatter. The controlled circuits of the relay comprise the connections with the armature 30 and the front and back contacts 31 and 32 respectively. These controlled circuits may connect to solenoid operated valves, to a pump, or to such other device as may be desired to control the liquid level. Control may obviously be either through the front or the back contact of the relay, depending upon the duty to be performed. In the case of the refrigeration system mentioned a solenoid valve is connected to be opened by closing the front contact of the relay, in which case, in case of failure, the circuit will be opened and no dangerous flooding of the system will be produced, the equipment "failing safe."

The sensitive element, probe or condenser 10 comprises a bushing 33, preferably made of stainless steel or other corrosion resistant material, which may be threaded into the tank containing the liquid to be controlled. Permanently fixed into this bushing is an outer tubular sleeve 34, which may be of metal having corrosion resistant characteristics, or it may be porcelain coated. It is open at the lower end, and is provided, near the threads of the bushings, with a vent 35. Projecting centrally through the tube 34 is a central rod 36, which may also be porcelain coated, although this is not necessary in the case of a dielectric material like anhydrous liquid ammonia. However, even in this case the insulation may be used as a safety measure in the vent of the absorption of water. The rod is insulated from the bushing, and sealed against escape of ammonia vapor, by a compressible rubber gasket 37. This is held in compression by a nut 38 having a lip which presses against a cap or nipple 39 to which the coaxial cable connection may be fastened. The inner conductor of the cable connects to the rod 36 through a lead 39'.

The entire assembly constitutes a variable condenser whose capacity is changed by the rise of liquid between the outer shell 34 and the inner rod 36. As used in liquid ammonia, with a one-eighth inch spacing between the shell and rod, a capacity variation of about 300 micro-microfarads per inch variation in liquid level is provided. In the case of the ammonia the variation in capacity is provided by the difference in dielectric constant between the ammonia and air; where electrolytes are to be controlled the porcelain coating on the rod 36, the tube 34, or both, provides the dielectric, the liquid acting as one plate of the condenser in case only one of the two members is coated, or as the plates of two condensers in series in case they both are porcelain covered. In either event, the resistance introduced into the circuit by the liquid itself is not a material factor, and the device looks to the circuit like a pure capacity which varies with the liquid level.

In considering the operation of the device it should be borne in mind that all electromagnetic relays require more current to close them than they do to hold them in the closed position. This margin of operation may be small, but it always exists, and in one type of relay which I have found it convenient to use, the closing current is five milliamperes while the releasing current, or minimum current required to hold the relay closed, is one milliampere.

It will first be assumed that the variable condenser 14 is adjusted to minimum capacity, which, in the ordinary case, will be somewhere between five and ten micro-microfarads. This capacity is so small in comparison with the 250 micro-microfarads which it bridges that the effect of the series resistance 13 on the circuit may be neglected, and the voltage divider comprising the condenser 9 and the sensitive element 10 may be considered as a pure capacity, giving a full 90-degree phase rotation between the voltage applied between the leads 3 and 4 and the current which flows through the series circuit. Ignoring, for the moment, the effect of the grid leak 21, and any grid current which may flow in the tube, the potential of the grid 20 with respect to the lead 3 is fixed by the relative values of the two series capacities. Since there is no material phase rotation in either branch of the circuit the potential is in phase with that between the leads 3 and 4.

Similarly, the potential of the cathode 17 is fixed by the position of the variable contact 22 on the voltage divider 6, 7. The cathode voltage is also necessarily in phase with the voltage between the two leads 3 and 4. By adjusting the contact 22 the cathode potential may be so varied with respect to the potentials of anode and grid as to cause the tube to break down and close the relay. If, as is here contemplated, closing the relay causes a rise in the level of the liquid, the division of the voltage between the two series capacitances changes, making the grid more and more negative until a point is reached where conduction is either prevented entirely, or is reduced below the holding-current value of the relay, then the relay will open and the liquid level will cease to rise. The point at which this occurs can be adjusted by first setting the contact 22 so as to cause the relay to close, and by backing it off until the relay just opens at the maximum level desired.

Figure 5:
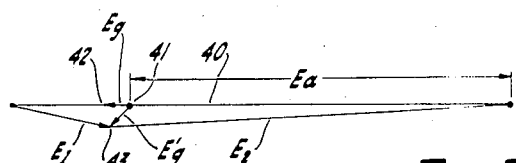
Fig. 5 is a vector diagram of the voltages effective at the operation points of my invention.

Under these conditions the voltage between the leads 4 and 3 is represented by the vector 40 of Fig. 5, and the potentials of both the cathode and grid of the tube lie upon this vector, the cathode at the point 41 and the grid at the point 42. The effective potential tending to cause breakdown of the tube is the portion of this vector indicated by the dimension line $E_a$; the control grid potential which tends to oppose the breakdown is represented by the small vector $E_g$, measured in the reverse direction from the point 41, and varying in magnitude as the capacity of the element 10 changes with varying liquid level. The point 41 remains fixed as long as the position of the variable contact 22 remains unchanged. As the liquid level falls the magnitude of the vector $E_g$ becomes smaller, and it may even reverse direction, but it always remains along the line of the vector 40 so long as the elements in this branch of the network are substantially pure capacities. It will be understood, of course, that this situation only obtains until breakdown of the tube occurs and discharge through it starts.

In tubes having negative control characteristics, such as the one here used, the negative control voltages (with respect to the cathode) applied to the grid can be thought of as preventing the principal discharge through the anode circuit of the tube. This is in contrast to certain related tubes in which the control voltage applied to the auxiliary electrode is positive, and the control electrode acts as a starting anode. The tube, of course, carries current only in the half of the cycle in which the plate is positive; in the part of the cycle where the grid swings positive there will be current to this element, but no real discharge will take place unless the plate is postive at the same time. The negative potential required to prevent discharge is approximately proportional to the positive potential applied to the plate, although owing to the curvature of the characteristic this proportionality is not exact. The amount of current carried by the tube depends upon the impedance in the anode circuit and the proportion of the cycle wherein the tube carries current, and if the characteristic of the tube were a straight line the tube would either carry current during the entire half cycle when the anode is positive or not at all. Since the characteristic is curved there is a range of magnitudes for the vector $E_g$ through which the current varies, but this range is very small and with the constants given a difference in level of a quarter of an inch or even less (depending upon the characteristics of the particular tube used), may cover the total range between the instrument's cutting in or out as the case may be. By decreasing the capacity in parallel with the sensitive capacitor 10 the range of operation between the critical points may be made even less than this.

Under many operating conditions a range of operation as small as this may not be sufficient. In nearly all industrial operations in which liquid level controls of any kind are used there is an optimum range within which the liquid level should be held. If this range is too narrow the device will cut in and out almost continuously, and if the instrumentality which it operates is an induction motor, for example, the constantly applied starting duty may be sufficient to burn it out even though the running load imposed upon it may be very light. On the other hand, the whole purpose of such a device is to maintain the level approximately constant, and too wide a range between the critical points of operation may be just as serious as too narrow a range, if not more so. One of the disadvantages of prior types of control has been that it is extremely difficult to adjust the range of operation and one of the most valuable features of my device is that the range is completely under control.

The variation in range of operation is accomplished by means of the circuit comprising the ten-megohm resistor 13 and the variable condenser 14. As has already been stated, when the condenser 14 is set to minimum capacity this branch has practically no effect upon the circuit as a whole; it reduces the impedance by two or three percent, and rotates the phase a few seconds. When, however, the condenser 14 is adjusted to the maximum capacity position, giving this branch of the circuit in parallel with the condenser 9 an appreciable admittance, it causes an advance in the phase of the voltage across the condenser 9 by approximately ten degrees with respect to that across condenser 10. It also decreases, slightly, the total impedance of the circuit, but this is unimportant as it can be adjusted for by moving the contact 22. In other words, it requires a slightly greater capacity in the element 10 to cause the voltages across it and the condenser 9 to divide in the same ratio, but this is adjustable by the contact 22 in any case.

With the resistor 13 cut into the circuit to a greater or less extent by the operation of the variable condenser 14, the voltages across the two arms of the circuit divide as is also shown in Fig. 5, the voltage across the element 10 being represented by the vector $E_1$ while the voltage across the condenser 9 in parallel with the elements 13 and 14 is represented by the vector $E_2$. The grid potential now becomes that of the point 43, and the grid voltage is represented by the short vector $E'_g$.

It will be seen that this latter vector is no longer directly out of phase with the plate potential, but has been advanced with respect thereto and accordingly the grid potential is no longer directly proportional and opposite to the voltage on the plate. Whether the tube carries current or not depends now not only on the mere magnitude of the vector $E'_g$, but also upon its phase angle with respect to the plate voltage. The grid voltage, in fact, will fall to zero while there is still a material positive potential upon the plate and complete cut-off will not occur until the projection of the vector E'g upon the vector 40 is equal to the value of Eg which itself would accomplish cut-off. Accordingly, the tube does not pass suddenly from the condition of full-current to no-current, but decreases the current gradually with change in liquid level, and, again with the particular constants of the device described, the range of operation may be extended from the fractional inch as described before to a foot or more.

Essentially the two voltage dividers constitute an A. C. bridge circuit, with the controls of the tube connected as the diagonal of the bridge. With minimum capacity of the condenser 14 the bridge is approximately balanced as to both potential and phase when the capacities are so set that the tube does not fire; more capacity in the condenser 14 effectively puts resistance in parallel with one of the condenser arms of the bridge and destroys the phase balance, even though the voltage balance be re-established.

In actual practice the voltage relationships are not so simple as those which have been described. The grid draws current during the portion of the cycle in which it is positive, and thus collects a negative charge upon the condensers coupled between grid and cathode. The time constant for the discharge of this circuit is very long, and there is accordingly a substantially constant negative bias potential upon the grid on which the vector potentials are imposed. Moreover, the condenser 29 and the inductance and resistance of the relay coil 28 constitute a filter circuit, the effect of which is to impose a constant negative bias upon the plate as well.

Owing to the vagaries of gaseous conduction tubes it is practically impossible to compute either the actual magnitude of these potentials or their effect upon the circuit. These facts are, however, of no practical importance, since they are automatically compensated for in setting the device; the alternating potentials are readily made to override the biases, and they are, if anything, helpful.

When the condenser 14 is used to adjust the range of operation of the instrument it will generally be necessary to do this in two steps. Actually the approximate setting of the condenser 14 which will be required is usually known by experience, but if it is not the condenser can be set to the minimum capacity position and the contact 22 can be set for the proper release level as before described. The liquid level can then be allowed to sink by the amount required, and the condenser 14 adjusted until the relay cuts in. The contact 22 is then readjusted to the proper cut-out level as before. If necessary this operation can be repeated one or more times until the proper operating range is discovered by a series of approximations. In any given installation experience will quickly teach how much variation of the condenser 14 is necessary to produce a desired operating range. A change of tubes will usually require a change of adjustment, but a minor one.

Fig. 4 shows the device connected to operate in a manner modified in several respects. The form shown is one which I have used in a dairy installation where it was desired that an extremely accurate and sensitive control be used, and where it was also a desideratum for reasons of sanitation that no part of the control equipment should come in contact with the milk whose level it was desired to control. In this case also it was necessary that the pump operate to empty the container in which the level was to be controlled, and the condition of "failing safe" required that if a failure occurred the pump should cease to operate. The actual pumping equipment is not shown, having nothing to do with the instant invention.

Since, with the exception of the capacitive circuit itself, the equipment is identical with that shown in Fig. 1, the various elements are identified by the same reference characters. In the capacitive network, however, certain of the parts are interchanged. For safety the ground has been changed from the lead 4 to the lead 3, and the protective resistor 11' has been transposed to connect to the lead 4. The condenser 12' takes the place in the circuit of the ballast condenser 12 in parallel with the sensitive element 10, and provides the voltage drop represented in the vector diagram by E'. The resistor 13 and condenser 14 occupy the same positions as before and exercise the same function.

In this case, however, the capacity which is varied by liquid level has been transferred to the position formerly occupied by the condenser 9. One plate of this condenser becomes the milk itself (indicated by the reference character 50), within the grounded stainless steel vat 51. The other condenser plate is a conducting disc 52 mounted on a glass plate 53 which covers the vat. This plate connects through a lead 54 to the grid of the tube. A short length of coaxial cable 55 makes the connection to the vat and the plate 52, and provides a certain amount of ballast. If the run were very short it might be necessary to provide some small additional capacity in parallel with that provided by the plate 52 and the milk, but the capacity should be small, since in the case mentioned the actual capacities used in the circuit were very nearly the same as those employed in the application first described. The smaller the capacity in this branch of the circuit the greater the sensitivity of the device. If no ballast is used, however, the apparatus becomes so sensitive that uncontrollable extraneous effects may make its operation uncertain. It can, however, be made sensitive enough to handle any practical case with which I have ever been confronted without loss of stability.

It will be seen that with this connection a decrease in liquid level will cause a decrease in capacity and an increase in the relative length of the vector E₂ in Fig. 5, increasing the length of the vectors Eg and E'g and opening the relay, thus causing the equipment to "fail safe" in this condition as it did before.

It will be appreciated that by changing the values of the capacities in the various branches of the circuit, by utilizing either the front or the back contacts of the relay, and by varying the position of the phase shifting circuit 13, 14, an almost unlimited range of situations can be taken care of.

As stated above, I prefer to use resistors 6 and 7 in the cathode branch of the circuit, but an inductive potential divider can be used instead. The phase shifting circuit can also be transferred to one branch of the voltage divider 6, 7. The particular organization of the circuits shown is preferred because it permits the use of economical components which may readily be obtained and which are small in size and permanent in nature and adjustment. A variable inductor might be substituted for the condenser 14, but it would be much less convenient, more costly, and heavier. If these changes are made, of course, it would be necessary to be sure that the phase shifting circuit were applied across the proper arm of the voltage divider to which it was applied so as to get the phase shift in the right direction. Thus, if an inductor were used in place of the condenser 14 it would be necessary to shift the circuit to a position across the condenser 12 or 12' in order to shift the vector in the proper direction. Similar precautions would have to be taken in case the phase shift were applied to the circuit which is now resistive.

The milliammeter 27 is not an essential part of the device, but it is of assistance in setting the circuit, and, if desired, it may be calibrated directly in liquid level. This, however, can only be done in a specific installation, since the calibration would be affected by variations in the setting of the range of operation by condenser 14. Where it is so used I prefer to use a directly calibrated milliammeter and to provide a calibration curve for the convenience of the user.

Because of the very wide field of operation in which equipments of this character are used the examples which I have given are to be taken merely as illustrative and not as limitations upon the scope of the invention: I desire patent protection which is as broad as is possible within the scope of the following claims.

I claim:

1. A liquid-level control comprising a capacity element variable by varying the level of the liquid relative thereto, a capacitive circuit connected in series with said element and forming therewith a voltage divider circuit adapted for connection across an alternating current supply, a resistive voltage divider circuit connected in parallel with said first mentioned voltage divider, a grid-glow tube having a cathode connected to an intermediate point on one of said voltage dividers and a control electrode connected to an intermediate point on the other and an anode circuit including an instrumentality to be operated, and means for varying the phase angle of an arm of one of said voltage divider circuits, whereby the latitude between critical operating points of said tube can be varied while maintaining a desired value for one of such critical points.

2. A liquid-level control in accordance with claim 1 wherein said phase varying means comprises a variable series resistor-capacitor circuit connected across a capacitive element of said first mentioned voltage divider circuit.

3. A liquid-level control comprising a pair of series connected capacitive elements, one of said elements being variable by variation of the level of the liquid to be controlled, a non-capacitive voltage divider connected in parallel with said series pair of elements and adapted for connection across an alternating current supply circuit, and a grid controlled tube having a control circuit connected between the junction of said capacitive elements and an intermediate point on said voltage divider and a work circuit including an instrumentality to be controlled.

4. A liquid-level control in accordance with claim 3 including means for varying the phase angles in one side of the parallel connection.

5. A control device for actuation by an alternating current supply comprising a bridge circuit having two pairs of arms, the two arms in each pair having like phase characteristics to provide a bridge which can be balanced in both phase and magnitude, a gaseous conduction tube having a cathode, an anode and a control electrode, said cathode and control electrode being connected across a diagonal of said bridge circuit, a variable impedance circuit connected in parallel with one of said bridge arms, said variable impedance circuit having a different phase characteristic from the bridge arm across which it is connected, means for varying the impedance in one arm of said bridge in accordance with a quantity to be controlled, means for connecting said bridge circuit across said supply and a work circuit adapted for connection to said supply and including said cathode and anode.

6. A device in accordance with claim 5 wherein said variable impedance circuit comprises a resistor and a variable condenser in series.

7. A control device for actuation by an alternating current supply comprising four impedance elements connected as the arms of a bridge circuit, means for varying the impedance of one of said elements in accordance with a quantity to be controlled and proportioned to bring said bridge approximately into voltage balance, means for connecting said bridge circuit to said supply, a gaseous conduction tube having an anode and a cathode and a control electrode connected across the balanced diagonal of said bridge circuit, means connected in one arm of said bridge circuit for preventing accurate phase balance of said bridge at the condition of voltage balance, and a work circuit including the cathode and anode of said tube and means for connecting the same to said alternating current supply.

DAVID M. COMB.

REFERENCES CITED

The following references are of record in the file of this patent:

UNITED STATES PATENTS

| Number | Name | Date |
|---|---|---|
| 2,331,771 | Germeshausen et al. | Oct. 12, 1943 |
| 2,363,285 | Bartholy | Nov. 21, 1944 |

Disclaimer 2,477,511.—*David M. Comb*, Belmont, Calif. LIQUID LEVEL CONTROL. Patent dated July 26, 1949. Disclaimer filed Feb. 5, 1951, by the inventor.

Hereby enters this disclaimer to claim 3 but does not in any way disclaim the substance of claim 3 when incorporated with the elements set forth in claim 4 of said patent.

[*Official Gazette March 6, 1951.*]